G. P. ALTENBERG, DEC'D.
A. E. ALTENBERG, EXECUTRIX.
DISPENSING APPARATUS.
APPLICATION FILED MAR. 4, 1918.
1,412,329.
Patented Apr. 11, 1922.
2 SHEETS—SHEET 1.
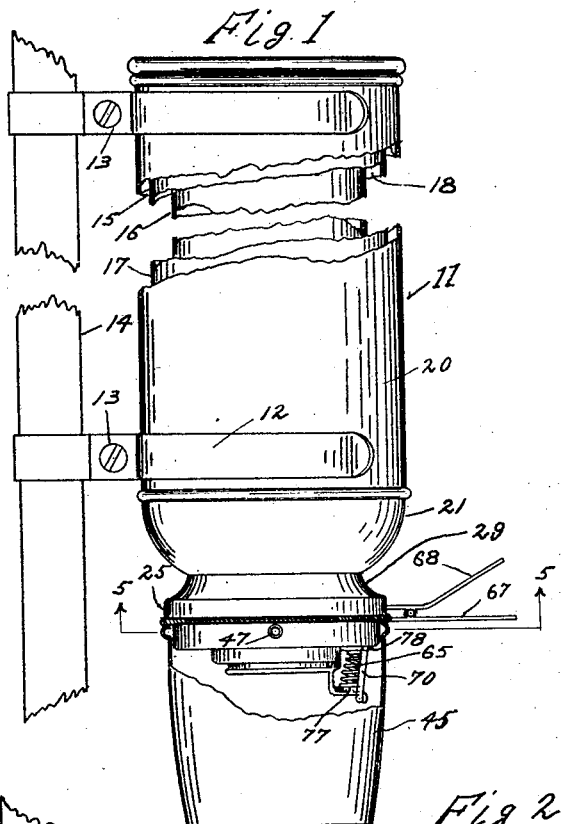

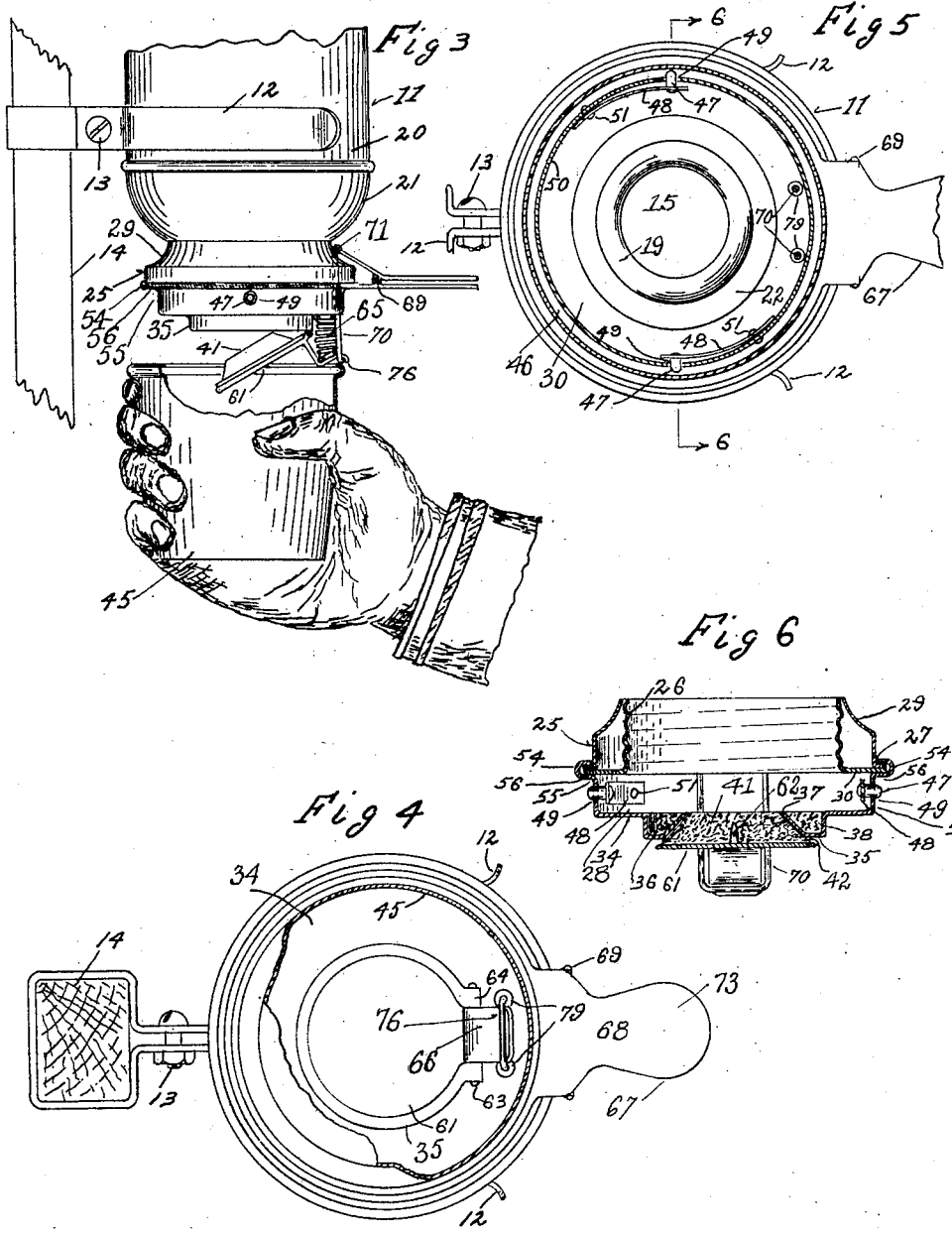

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

DISPENSING APPARATUS.

1,412,329.         Specification of Letters Patent.     Patented Apr. 11, 1922.

Application filed March 4, 1918. Serial No. 220,280.

*To all whom it may concern:*

Be it known that I, GEORGE P. ALTENBERG, a citizen of the United States, residing at Cincinnati, in the county of Hamilton and State of Ohio, have invented certain new and useful Improvements in Dispensing Apparatus, of which the following is a specification.

The present invention is an improvement upon the vessel shown, described and claimed in my application for Letters Patent of the United States, Serial No. 216,800, filed February 12, 1918.

My invention is especially useful for employment on aeroplanes, or other vehicles, on which the number of parts to be manually operated by the driver are quite numerous and the hands of the operator have quite a number of duties to perform, so that it is extremely undesirable, in fact dangerous, for the operator to release both hands simultaneously from the operating parts of the machine.

I have provided a vessel, shown as of the vacuum-insulated type, in which the liquid refreshment or stimulant, for instance, hot coffee or hot tea, may be maintained in heated condition for a long time, for instance an entire day. The vessel containing the refreshment or stimulant is arranged to be secured in inverted position to the aeroplane, or other vehicle, so that the mouth of the vessel is presented downwardly. The vessel is provided with an automatic closure normally held closed for retaining the contents in the vessel. A cup is arranged to be releasably secured about the closure, and means are provided acting on the closure to manually open the same while the cup is releasably secured thereabout. The parts are preferably so arranged that overflow of the cup is prevented when the last-named means are manipulated. After the cup is removed it may be held in receiving position under the mouth and said last-named means manipulated by the cup for again charging the cup.

It is the object of my invention to provide a vessel so arranged that the contents thereof may be withdrawn in selected and desired quantities into a suitable cup or container and dispensed by the employment of only one hand, preferably in such manner that the contents may be drawn into the cup or container by one hand and the cup or container then removed from the vessel for partaking of the contents, and also desirably in such manner that contents of the vessel may be drawn into the cup or container by employment of one hand, either before the cup or container is removed from the vessel, or after such removal has taken place, or under both such relations.

It is the object of my invention, further, to provide a vessel arranged to be placed in inverted position with its mouth presented downwardly and having a cup, with means whereby the cup may be filled with contents of the vessel in such manner that overflow of the cup is prevented.

It is the object of my invention, further, to provide a closure-cap for a vessel provided with means for attaching the same to vessels and having a closure thereon, and means on said closure-cap for releasably securing a cup about said closure, the said cap provided with manually operated means for opening said closure, and said closure preferably provided with means manipulated by said cup for opening the same when said cup is in receiving position.

The invention will be further readily understood from the following description and claims, and from the drawings, in which latter:

Fig. 1 is a front elevation of an exemplification of my invention, showing a vacuum-insulated bottle, partly broken away, secured in inverted position to an aeroplane, the latter partly broken away, and the vacuum-insulated bottle having its cup applied thereto, the latter partly broken away for exposure of its interior.

Fig. 2 is a similar view, showing the mouth end of the bottle, with the manually operated part manipulated for opening the closure, the parts being shown partly in axial section and having the cup applied to the bottle.

Fig. 3 is a similar view, showing the cup pressed toward the bottle by means of one hand for opening the closure to withdraw contents of the bottle into the cup.

Fig. 4 is an end view of my improved device, taken from the mouth end, and showing the cup partly broken away to expose the closure of the vessel.

Fig. 5 is a horizontal section of my improved device, taken in the plane of the line 5—5 of Fig. 1.

Fig. 6 is an axial section of the cap, taken in the plane of the line 6—6 of Fig. 5.

Fig. 7 is a side elevation of my improved device, partly broken away; and

Fig. 8 is a side elevation of my improved device, partly in section in the plane of the line 8—8 of Fig. 2.

The vessel 11 is held in inverted position on the aeroplane, as by being received between spring clips 12 secured by screw and nut connections 13 about a stanchion 14 of the aeroplane, convenient to the seat of the operator, so that the operator may readily reach and fill the cup of the vessel while manipulating his machine.

The vessel exemplified is a vacuum-insulated bottle having an inner vessel 15 of frangible material, for instance glass, comprising an inner wall 16, an outer wall 17, arranged concentrically throughout, and having a vacuum-insulated space 18 between them, the inner and outer walls being connected at their mouths by a cross-seal 19. The outside of the vessel comprises a casing 20. The casing is preferably of sheet-metal, the inner vessel described, when employed, being preferably releasably held in the casing, accomplished in suitable manner. The casing is provided with a breast 21 and a neck 22.

A closure-cap 25 is provided. This closure-cap is exemplified as releasably connected with the casing.

The cap and vessel are provided with coacting securing means, so that the cap may be used in connection with a plurality of bottles. These coacting securing means are shown as threaded connections, although other connections for the purpose may be employed. Thus a ring 26 is provided with screw-threads, which coact with screw-threads of the neck of the casing.

The cap is preferably provided with a median annularly outwardly bulged portion 27 having an annular space 28 therein. The cap may comprise a canopy 29, which extends slantingly toward the axis of the bottle at one end of the annularly bulged portion. The screw-ring is located within the canopy. When the closure-cap is screwed in position on the threaded neck of the bottle, its inner end coacts with the outer end of the breast of the casing for securing the closure-cap firmly but releasably upon the neck of the bottle. The screw-ring has an annular laterally extending flange 30, the outer edge of which is supported by the screw-cap.

The parts are so arranged that the cap is interchangeable with various bottles. The ordinary closure for the bottle is by means of a cork or stopper received in the mouth and within the neck of the inner vessel. My improved device dispenses with this usual or ordinary closing means and provides an automatically acting closure for the bottle.

The cap, in the present exemplification, is provided with a closing means for the vessel. Thus the cap at the other end of the annularly bulged portion is provided with a laterally inwardly extending flange 34, the inner portion of which is provided with an outwardly bulged annular bead 35, forming an inner annular recess 36, the inner wall 37 of which is preferably substantially frusto-conical in form, with its end of smaller diameter extending inwardly of the inner vessel. This inner wall preferably forms an extension of the mouth of the inner vessel. An inner ring 38 is located in the recess 36. This inner ring or inner cushion-member may consist of a ring of compressible material, such as cork or rubber, and is instanced as cork. The cap is threaded over the threaded neck of the vessel, the cushion-member 38 being compressed against the mouth of the inner vessel for forming a connection therewith to prevent leakage of fluid past said mouth into the cap.

The closing means for the mouth is exemplified as a stopper 41 which coacts with the wall 37. The inner cushion-member 38, which coacts with the mouth of the vessel, and the stopper 41, which coacts with the wall 37, are at opposite sides of said wall 37, when the stopper is closed. The stopper is exemplified as of frusto-conical shape to fit the frusto-conical wall 37 for aiding in the ready seating of said stopper and its ready release for the purpose hereinafter explained. It preferably has an annular flange 42 which coacts with the outer end-face of the cap.

The stopper is provided with means for automatically closing the same, and means are provided for manually opening the stopper during the time that the stopper has the cup received thereabout, and the stopper is also preferably so constructed as to be released by coaction therewith by a cup held in the hands of the user, for receiving contents of the vessel.

A cup is exemplified at 45, and is arranged to be releasably secured to the vessel by a simple movement of the hand of the operator. This movement is preferably a substantially axial movement of the cup, regardless of the position of the cup in the hand, the complemental fastening means being exemplified as an annular groove 46 in the cup near its mouth and pins 47 in the cap. The pins are exemplified as on flat springs 48, located in the annular space 28 and projecting through openings 49 in a substantially cylindrical portion 50 of the cap, the other ends of the springs being fastened to said cap, as by rivets 51.

The outwardly bulged portion of the cap is exemplified as provided with a knurled section 54 for aiding in grasping thereof by the hand for turning the same. The canopy 29 is located at one end of said knurled section and there is an annular recess 55 at the outer end thereof for receiving the mouth of the cup, the pins urging the mouth of the cup against the annular inner end wall 56 of said recess.

The stopper 41 is shown on a lever, exemplified as comprising a plate 61 to which the stopper is secured, as by prongs 62 extending from the plate into the stopper. The lever is pivoted to the cap on a pin 63, having bearing in bearings 64 on the cap. A spring 65 normally urges the stopper into closed position. The lever is provided with a projection 66.

A wing 67 extends laterally from the cap and is preferably rigid with the cap and with the bottle. An operating lever 68 is pivoted to the cap, as by a hinge 69 between the lever and the wing. A strap 70 is articulated with the lever at 71 and is received stirrup-like about the projection 66, the stretches of the strap being received at the respective sides of the spring 65. The wing is provided with a thumb-engaging part 72 and the lever 68 is provided with a finger-engaging part 73.

Assuming that it is desired to withdraw contents from the bottle or container into the cup, and the cup is in its normal position about the mouth of the vessel, the operator of the machine, using the thumb and finger of one hand, causes pressure between the parts 72 and 73, whereby the stopper is opened for discharging contents into the cup. When a sufficient amount of contents has been received by the cup, the lever 68 is released, the stopper thereby automatically closing. Overflow of the cup is prevented for the reason that the mouth end of the cup extends beyond the outer end of the mouth of the cap. When the liquid 74 in the cup has reached the mouth of the cap, no further air will be admitted into the vessel and the flow therefrom will cease. (See Fig. 2). The construction also minimizes the action of temperature outside the cup on the contents of the vessel. The inner end of the lever may move in an opening 75 in the cap.

The operator may now remove the cup, by the use of the same hand, by means of which he has withdrawn contents into the cup, and if he desires, may again open the stopper by pressure of the cup upon the projection 66, either before or after he has partaken of the contents. For this purpose the projection is provided with a recess 76 for receiving the edge of the cup. The spring 65 is located between the cap and the projection, being received in sockets 77 and 78, respectively on the cap and projection. The stretches of the strap 70 may pass through holes 79 in the flanges 30 and 34.

The cup is readily replaced on the vessel by a simple pressure of the hand on the cup toward the vessel.

Having thus fully described my invention, what I claim as new and desire to secure by Letters Patent, is:

1. In combination, a vessel comprising a mouth, a closure for said mouth, said closure provided with means arranged to be manipulated by a cup while in receiving position under said mouth for opening said closure and receiving flow from said mouth, releasable holding means for releasably holding said cup about said mouth and said last-named means, and an additional manually operated means independent of said cup having connection with said closure for opening the same.

2. In combination, a vessel comprising a casing and a mouth arranged to be placed in inverted position for presenting said mouth downwardly, a closure for said mouth, a cup, complemental releasable securing means between said cup and casing for holding said cup under said mouth, manually operated means operable independent of said cup extending outside said cup for opening said closure while said cup is so held under said mouth, by means of said complemental releasable securing means, and resilient means for normally closing said closure, said closure provided with means arranged to be manipulated by said cup after release of said cup from said complemental releasable securing means and while in receiving position under said mouth for opening said closure and receiving flow from said mouth, said last-named means located in said cup while said cup is releasably secured to said casing by said releasable securing means.

3. In combination, a vessel comprising a neck-portion, a ring received about said neck-portion, complemental securing means between said ring and vessel, a cup, complemental releasable securing means between said cup and ring, a closure for the vessel on said ring within said cup, and manually operated means on said ring extending outside said cup for operating said closure.

4. The combination of a vessel arranged to be held in inverted position with the mouth of said vessel projected downwardly, a closure for said mouth pivoted to said vessel, means for resiliently holding said closure in closed position, said closure provided with a downwardly and laterally extending projection having a cup-contacting face thereon whereby a cup held in receiving position under said mouth is arranged to press said cup-contacting face for opening said closure, and a manually operated lever pivoted to said vessel and having connection with said closure for opening the same.

5. The combination of a vessel arranged to be held in inverted position with the mouth of said vessel projected downwardly, a cup, means for releasably securing said cup to said vessel under said mouth, a closure for said mouth pivoted to said vessel, resilient means for normally holding said closure closed, said closure provided with a downwardly and laterally extending projection having a cup-contact face thereon within said cup when releasably secured to said vessel, and a lever pivoted to said vessel extending outside said cup when so releasably held and having connection with said closure for opening said closure to withdraw contents of said vessel into said cup so held, and arranged whereby said cup held in receiving position under said mouth is arranged to press said cup-contacting face for opening said closure.

6. The combination of a vessel comprising a casing having a screw-threaded neck and a breast, a closure-cap, said closure-cap comprising a canopy extending toward said breast and toward the axis of the vessel, a screw-ring inside said canopy, and a flange extending laterally inward about the mouth of said vessel from the outer end of said closure-cap, a closure for said mouth on said cap, said closure provided with cup-contact means for opening the same, and a cup received about said cap, said cup and cap provided with complemental securing means.

7. The combination of a vessel comprising a casing having a threaded neck and a breast, a closure-cap comprising a screw-ring threaded about said neck, and a flange coacting with the mouth of said vessel, said flange and screw-ring having a space between them, pins extending outwardly through said closure-cap, spring means in said space pressing said pins outwardly, and a cup provided with annularly arranged recess means complemental to said pins for releasably securing said cup to said closure-cap.

8. The combination of a mouth arranged to be presented downwardly, closing means for said mouth, a cup, complemental releasable securing means between said cup and said mouth for normally supporting said cup about said mouth, and a part arranged to be contacted by a cup released from supporting relation to said mouth and held in receiving position under said mouth acting on said closure for opening the same whereby to cause flow into said cup so held, said part located in said cup when said cup is normally supported about said mouth by said complemental releasable securing means.

9. The combination of a mouth arranged to be presented downwardly, closing means for said mouth, a cup, complemental releasable securing means between said cup and said mouth for normally supporting said cup about said mouth, a part arranged to be contacted by a cup released from supporting relation to said mouth and held in receiving position under said mouth acting on said closure for opening the same whereby to cause flow into said cup so held, said part located in said cup when said cup is normally supported about said mouth by said complemental releasable securing means, and manually operated means for said closure provided with manual contact means located outside said cup when said cup is normally supported about said mouth by said complemental releasable securing means.

10. The combination of a mouth arranged to be presented downwardly, closing means for said mouth, a cup normally located about said mouth, a part arranged to be contacted by a cup released from supporting relation to said mouth and held in receiving position under said mouth acting on said closure for opening the same whereby to cause flow into said cup so held, said part located in said cup when said cup is in said normal location about said mouth, manually operated means for said closure provided with manual contact means located outside said cup when said cup is in said normal position, and means for releasably holding said cup about said mouth with the mouth of said cup higher than said mouth of said vessel.

11. In combination a dispensing mouth arranged to be presented downwardly, a closure for said mouth, a cup having a mouth, means for operating said closure by means of said cup, means for releasably securing said cup with relation to said first-named mouth for causing said mouth of said cup to extend above said first-named mouth with said last named means maintained in normal relation in said cup, and means operable independent of said cup for opening said closure extending outside said cup for opening said closure while said cup is releasably secured about said first-named mouth.

12. The combination of a vessel comprising an inner frangible vessel and a casing therefor, said casing provided with a screw-threaded neck, a cap having inner screw threads received about the screw-threads of the said neck, a closure for said vessel on said cap, a cup received about said closure, said cup and cap provided with complemental securing means for releasably securing said cup to said cap, and manually operated means for operating said closure extending laterally from said cap between said cup and the body of said casing.

13. The combination of a vessel comprising a casing having a threaded neck, a screw-cap having a median outwardly bulged annular portion, said cap provided with threads at one end of said cap coacting with said threaded neck, the said cap provided at its other end with a laterally inwardly extending cap-flange coacting with the mouth of said vessel, a closure for said mouth on said screw-cap, a cup, releasable securing means between said cup and said cap, and manually operated means for operating said closure extending laterally from said cap between said cup and the body of said casing.

14. The combination of a vessel comprising a casing having a screw threaded neck, a mouth therefor, a closure-cap having a median outwardly bulged annular portion from which a canopy extends slantingly radially inward at one end of said outwardly bulged annular portion, a screw-ring in said canopy, said canopy coacting with the base of said neck, said closure-cap provided with a laterally inwardly extending flange at the other end of said outwardly bulged annular portion, said flange having an opening which coacts with said mouth, a closure for said mouth on said closure-cap, a cup, releasable securing means between said cup and said cap, and manually operated means for operating said closure extending laterally from said cap between said cup and the body of said casing.

15. The combination of a vessel comprising a casing having a screw threaded neck, a mouth therefor, a closure-cap having a median outwardly bulged annular portion from which a canopy extends slantingly radially inward at one end of said outwardly bulged annular portion, a screw-ring in said canopy, said canopy coacting with the base of said neck, said closure-cap provided with a laterally inwardly extending flange at the other end of said outwardly bulged annular portion, said flange having an opening which coacts with said mouth, a closure for said mouth on said closure-cap, the inner portion of said closure-cap provided with a space between said screw-ring and said flange, pins in said space extending outwardly through said canopy, a cup provided with an annularly arranged coacting means whereby said cup is releasably secured to said cap, a cup, releasable securing means between said cup and said cap, and manually operated means having connection with said closure for operating the same and extending laterally from said cap between said cup and body of said casing.

16. In combination, a cap for a vessel having means thereon for releasable attachment to a vessel and comprising a mouth-flange for the mouth of said vessel, an annular compressible packing means for said flange to coact with said mouth, a closure on said cap, means on said cap for resiliently urging closed relation of said closure, said closure provided with a cup-contact part for opening said closure, manually operated means on said cap for opening said closure, said manually operated means including a lever, and a strap extending from said lever and received about said spring and having connection with said closure for opening the same.

17. In combination, a vessel comprising a casing and a mouth, a closure for said mouth, a cup received about said mouth, complemental releasable securing means between said cup and casing, said closure provided with a downwardly and laterally extending projection having a cup-contact face whereby a cup held in receiving position under said mouth is arranged to press said cup-contacting face for opening said closure, a spring between said projection and said cap for normally closing said closure, a lever pivoted to said cap, and a strap extending from said lever and received about said spring and projection for manually opening said closure.

18. In combination, a cap for a vessel provided with securing means for securing said cap to said vessel, a closure for the mouth of said vessel pivoted to said cap, said closure provided with a downwardly and laterally extending projection having a cup-contact face thereon whereby a cup held in receiving position thereunder is arranged to press said cup-contact face for opening said closure, a spring between said cap and projection for normally closing said closure, a wing extending laterally from said cap, a lever pivoted with relation thereto, said wing and lever provided with thumb and finger contacted portions whereby to manually open said closure, and connecting means between said lever and projection.

19. In combination, a cap for a vessel comprising means for securing said cap to said vessel, a closure on said cap, and a cup received about said closure, said cup and said cap provided with complemental securing means for releasably securing said cup to said cap, said closure provided with a projection within said cup arranged to be contacted by said cup held in receiving position under said closure for opening said closure, said cap provided with a wing, a lever pivoted with relation thereto, said lever having connection with said projection, and said wing and said lever having complemental thumb and finger pressed means whereby to open said closure.

In testimony whereof, I have hereunto signed my name in the presence of two subscribing witnesses.

GEORGE P. ALTENBERG.

Witnesses:
J. M. PENCE,
DAWSON E. BRADLEY.